Feb. 21, 1933. G. A. WILLIAMS 1,898,652
DIRECT AIR PULSATOR
Filed July 8, 1930
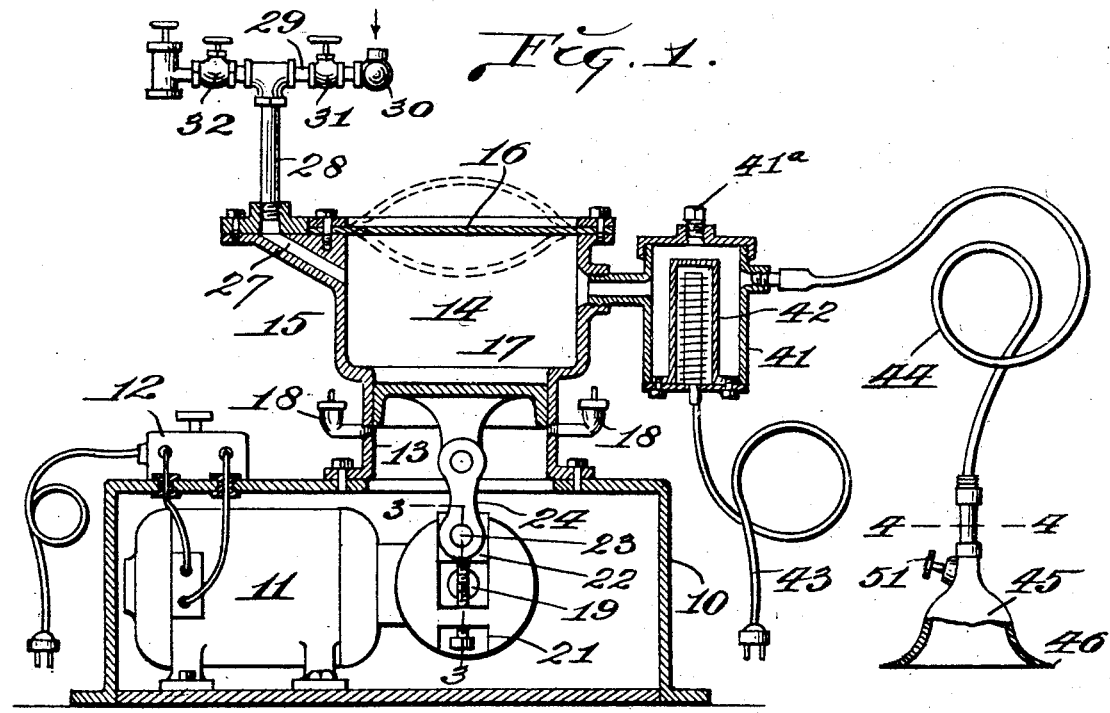
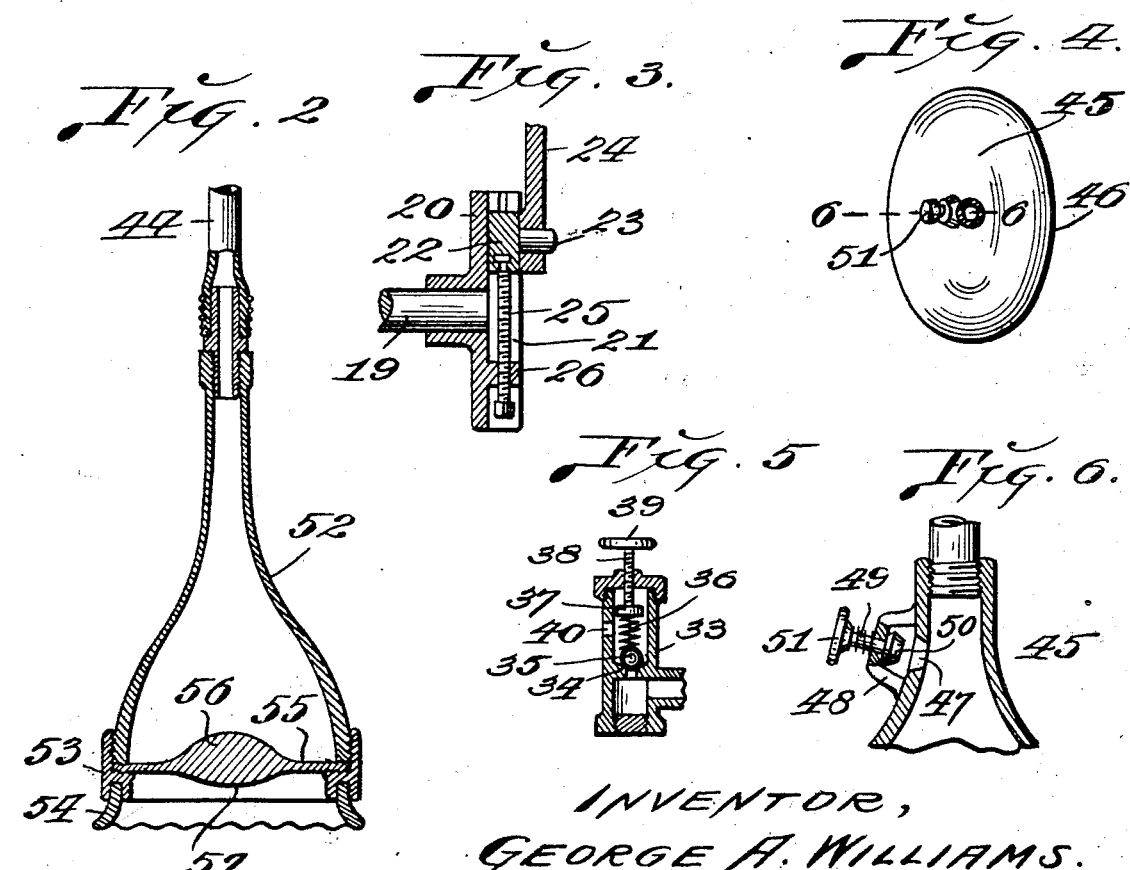
INVENTOR,
GEORGE A. WILLIAMS.
BY Martin P. Smith ATTY.

Patented Feb. 21, 1933

1,898,652

UNITED STATES PATENT OFFICE

GEORGE A. WILLIAMS, OF LOS ANGELES, CALIFORNIA

DIRECT AIR PULSATOR

Application filed July 8, 1930. Serial No. 466,373.

My invention relates to an air pulsator and has for its principal object the provision of a relatively simple, practical and inexpensive device wherein the alternate compression and suction of air is utilized for producing pulsations which, through the medium of suitable applicators, may be utilized as a therapeutic medium for the treatment of various bodily ailments and particularly for the gentle massage or treatment of the skin for the purpose of stimulating blood circulation and the treatment of tissues and muscles beneath the skin.

A further object of my invention is, to provide a device of the character referred to wherein a body of air is confined within a chamber, one of the walls of which is elastic and to rapidly compress the confined body of air to produce comparatively rapid alternate pressure and suction through an applicator havng a relatively thin edge that is positioned directly upon the skin so as to produce rapid vibratory suction upon the area covered by the applicator and which action is in the nature of vibratory massage that is highly beneficial in the treatment of various ailments of the body.

Further objects of my invention are to provide simple and efficient means for regulating the action of the air pulsating mechanism; further, to provide means whereby the column of air that passes through the device may be heated or whereby liquid or compounds may be heated and vaporized to produce medicated vapor, further, to provide a pulsator of the character referred to that is comparatively light in weight, strong and durable and very compact so that it will occupy relatively little space when packed for storage or transportation and further, to provide an applicator having a weighted flexible or elastic diaphragm which, when vibrated, will produce relatively light tapping impulses that may be applied with beneficial results to different parts of the body.

With the foregoing and other objects in view, my invention consists in certain novel features of construction and arrangement of parts that will hereinafter be more fully described and claimed and illustrated in the accompanying drawing, in which:

Fig. 1 is a vertical section taken through the center of an air pulsator constructed in accordance with my invention.

Fig. 2 is a vertical section taken through the center of one of the applicators utilized in connection with the pulsator.

Fig. 3 is an enlarged vertical section taken on the line 3—3 of Fig. 1.

Fig. 4 is a horizontal section taken on the line 4—4 of Fig. 1.

Fig. 5 is a vertical section taken through the center of a regulating check valve utilized for controlling the outlet of air from the compression chamber of the pulsator.

Fig. 6 is an enlarged detail section taken approximately on the line 6—6 of Fig. 4.

Referring by numerals to the accompanying drawing which illustrates a practical embodiment of my invention, 10 designates a box-like container, which forms the base of the pulsator and arranged therein is a small electric motor 11 that is controlled by a rheostat 12, the latter being preferably located on the exterior of the housing 10.

Secured to and projecting upwardly from the top of housing 10 is a short cylinder 13 and the upper end thereof communicates with a combined compression and suction chamber 14 that is formed within a housing 15.

The upper end of chamber 14 is closed by a head 16 of elastic material, preferably rubber or composition having rubber as its principal ingredient and the edges of which head is secured to the upper end of housing 15.

Arranged for reciprocatory movement within cylinder 13 is a piston 17 and seated in the wall of cylinder 13 are grease cups 18, by means of which the piston is lubricated.

The shaft of motor 11 is connected by suitable gearing to a short horizontally disposed shaft 19 that is journalled in suitable bearings and the outer end of the shaft carries a disc 20 in the outer face of which is formed a diametrically arranged slot 21.

Arranged for sliding movement in this slot is a block 22 from which projects a wrist pin 23 and connecting this wrist pin and the piston 7 is a link or connecting rod 24. Block 22 that carries the wrist pin is adjustable toward and away from the center of the disc by the screw 25 that is arranged for rotation in a lug 26 on said disc.

Formed through the side wall of housing 15 and communicating with chamber 14 is a duct 27 and communicating with the upper end of said duct is a short vertically disposed tube 28 that is connected at its upper end to a short horizontally disposed tube 29. Located on one end of said tube 29 is an inwardly opening check valve 30 and located between said check valve and the center of tube 29 that is connected to tube 28 is an ordinary shutoff valve 31.

Located in the opposite side portion of tube 29 is an ordinary shutoff valve 32 and connected thereto is a valve housing 33 provided with a seat 34 on which normally rests a check valve 35. Bearing on top of check valve 35 is a relatively light expansive spring 36 and the upper end of said spring bears against a disc 37 that is carried by a screw rod 38 and the latter being threaded through the top of the valve housing 33 and carrying on its upper end a hand wheel 39.

Formed through the wall of valve housing 33 above check valve 35 is an outlet port 40.

Detachably secured to the side of housing 15 is a housing 41 within which is arranged an electric heating element 42, to which is connected a cord and plug 43 so that said heating element may be readily connected to a suitable source of current supply, for instance, the household lighting system.

Connected to housing 41 is one end of a flexible tube 44 which may be of any desired length and to which are detachably connected the applicators forming a part of my improved pulsator.

In Figs. 1 and 4 I have shown a form of applicator which comprises a substantially bell-shaped member 45 of rubber or analogous material, the lower end of which terminates in an outwardly presented flange 46 that gradually decreases in thickness towards its outer edge.

Formed in the upper portion of the body of the applicator 45 is a port 47 and arranged for sliding movement through a bracket 48 on the applicator directly over this port, is a spring held rod 49 carrying at its inner end a valve 50 that is adapted to close port 47. The outer end of rod 49 carries a disc 51.

The form of applicator just described is designed particularly for imparting pulsating suction to the surface to which the flanged edge of the applicator is applied.

In the form of applicator illustrated in Fig. 2, the upper end of an elongated bell-shaped member 52 is detachably connected to the end of flexible tube 44 and removably seated on the large end of this body is a ring 53 that carries a contact ring 54 of soft flexible material such as rubber.

A diaphragm 55 of rubber or analogous material has its edge clamped between ring 53 and the end of the applicator body 52 and formed integral with or fixed to the central portion of the diaphragm 55 is a weight 56 having a centrally arranged convex outer face 57.

The lower edge of the contact ring 54 is preferably notched or serrated so as to permit air to readily pass into and out of the chamber surrounded by said ring while the latter is positioned on the surface to be treated and the diaphragm 55 is being vibrated.

In the operation of my improved pulsator, motor 11, when connected to a suitable source of current supply, drives shaft 19 carrying disc 20 and through connecting link 24, piston 17 will be reciprocated in its cylinder, thereby intermittently compressing and imparting suction to the body of air within chamber 14.

The elastic diaphragm of head 16 will yieldingly resist the compression of the air in chamber 14 and during operation the elastic head will be rapidly vibrated to the positions illustrated by dotted lines in Fig. 1.

Chamber 14 within housing 15 and the heating chamber within housing 41 combine to form an air chamber of considerable volume much greater than the air chamber through flexible tube 44 and the chamber within applicator 45 and said relatively large air chamber having a yielding wall 16. Such construction enables a comparatively large volume of air to be maintained in transit through the apparatus and the flow of such large volume of air is relatively slow.

Thus the piston in operation effects a pulsation of this relatively large volume of air and comparatively little air is forced out of the edge 46 of the applicator that is in contact with the surface that is being treated. This pulsating effect is greatly enhanced by the provision of the flexible wall 16 for if such flexible wall were not used, the operation of the piston 17 would produce a direct rapid flow of air through the apparatus and the applicator rather than the yielding gentle pressure of pulsations produced by the alternate compression and suction of air.

Further, by providing means for pulsating a relatively large volume of air, the flow of said air through the apparatus is comparatively slow and as a result the heating element within the housing 41 is able to more uniformly heat the air to the desired or proper degree and which effect could not be produced if the air were forced rapidly through the heating chamber.

On the suction stroke of the piston 17 air enters through inlet check valve 30 and passes from thence through connections 29 and 28 and duct 27 into chamber 14 and on the compression stroke of the piston a certain amount of air will pass out through duct 27 and connections 28 and 29 and thence past spring held check valve 35 and thence through outlet port 40.

The tension of spring 36 that resists the opening movement of check valve 35 may be regulated by manipulation of the screw rod 38.

The comparatively rapid pulsation of the body of air within the chamber 14 having the elastic head 16 will impart corresponding movement to the column of air within the heating chamber 41, flexible tube 44 and applicator 45 and when the thin edge 46 of this applicator is positioned on the body that area that is covered by the applicator will be subject to the rapid pulsations of the column of air, thereby imparting to the area under treatment relatively rapid pressure and suction or vibratory or pulsating massage that is highly beneficial in increasing circulation of the blood through the skin and underlying tissues and muscles.

During the compression strokes of the pulsator a relatively small quantity of air may be forced out beneath the thin edge of the applicator and during the suction strokes the thin edge of said applicator will be drawn against the skin, thereby producing a mild degree of suction upon the area covered by the applicator. This pulsating massage or vibratory action may be accurately controlled by placing a finger of the hand that holds the applicator upon disc 51 and pressing valve 50 inwardly to control the opening 47. This opening 47 is normally open to permit a free flow of air through said opening, but when said opening is closed or partially closed, the greater portion of the air movement through the applicator will take place between the thin edge 46 thereof and the surface to which said edge is applied so that the desired pulsating massage effect is produced.

Where the form of applicator illustrated in Fig. 2 is ultilized, the pulsating body and column of air imparts relatively rapid movement to the flexible or elastic diaphragm 55 and the movement of the latter imparts relatively light tapping blows to the surface that is covered by the flexible ring 54 carried by the applicator and the notched or serrated edge of said ring permits air to circulate freely through the chamber surrounded by ring 54 and beneath the elastic weighted diaphragm 55.

The length of the stroke of piston 17 may be accurately regulated by adjustment of block 22 in slot 21 and which adjustment is brought about by manipulation of screw 25 that is connected to said block 22. This adjustment of the block carrying the wrist pin permits the piston throw to be graduated to any desired degree and consequently enables the volume or strength of the pulsations to be varied throughout a comparatively wide range. Where the wrist pin is adjusted so that its axis is to a slight degree eccentric relative to the axis of shaft 19, the pulsations are so faint as to be hardly perceptible when the applicator is placed on the skin, although the suction is readily noticeable.

I have shown the applicator 45 as being oval when viewed in plan and while I prefer to make the applicator of this shape it will be understood that said applicator may be round or polygonal.

By connecting the plug of cord 43 to a suitable source of electric current supply the heating element 42 will be heated so as to heat the column of air that passes through container 41 and the flexible tube 44 that carries the applicator.

If desired medicinal compounds, either liquid or in semi-liquid form may be delivered into the container 41 and the column of air passing therethrough and the heat produced within the container will vaporize the liquid or semi-liquid, thereby producing medicated vapor that is highly beneficial in the treatment of various ailments.

The top of the container 41 is provided with an opening that is normally closed by a screw plug 41$^a$ and such construction permits liquids or semi-liquids to be delivered into the container.

If desired the air heater and evaporating chamber 41 may be dispensed with and the flexible tube 44 that carries the applicator may be directly connected to housing 15.

Thus it will be seen that I have provided an air pulsator that is relatively simple in construction and which may be conveniently and economically employed for producing relatively rapid and rythmic air pulsations for the treatment of various bodily ailments and particularly for the gentle massage of skin, for the stimulation of blood circulation therein and the beneficial treatment of tissues and muscles beneath the skin.

It will be understood that minor changes in the size, form and construction of the various parts of my improved direct air pulsator may be made and substituted for those herein shown and described without departing from the spirit of my invention, the scope of which is set forth in the appended claims.

I claim as my invention:

1. In an air pulsator, the combination with a duct and means for producing pulsations of the air column that passes through said duct, of an applicator carried by said duct, an elastic weighted diaphragm carried by said applicator and an elastic contact ring carried by said applicator and surrounding and arranged in front of said weighted diaphram.

2. In an air pulsator, the combination with a duct and means for producing pulsations of the air column that passes through said duct, of an applicator carried by said duct, a contact ring carried by said applicator, a weighted elastic diaphragm arranged within said applicator adjacent to said contact ring and a flexible contact ring carried by the end of said applicator and surrounding and arranged in front of said weighted diaphragm.

3. In an air pulsator, the combination with a supporting structure, a motor arranged within said structure, a cylinder on top of said structure, said cylinder having an air inlet and an air outlet, an elastic member closing the head of said cylinder so as to produce variable yielding pressure on the entire body of air within said cylinder as said air is pulsated, a piston arranged for reciprocatory movement within said cylinder, a housing connected to said air outlet of said cylinder and a flexible tube leading from said housing and adapted for connection to an applicator.

4. In an air pulsator, the combination with a supporting structure, a motor arranged within said structure, a cylinder on top of said structure, said cylinder having an air inlet and an air outlet, an elastic member closing the head of said cylinder so as to produce variable yielding pressure on the entire body of air within said cylinder as said air is pulsated, a piston arranged for reciprocatory movement within said cylinder, a housing connected to said air outlet of said cylinder, a flexible tube leading from said housing and adapted for connection to an applicator and means for heating the entire volume of pulsated air as it passes through said cylinder and housing.

In testimony whereof I affix my signature.

GEORGE A. WILLIAMS.